Feb. 23, 1926.                                              1,574,073
                         F. J. ENGLEN
                     LOCKING DEVICE FOR SCALES
                      Filed June 30, 1919
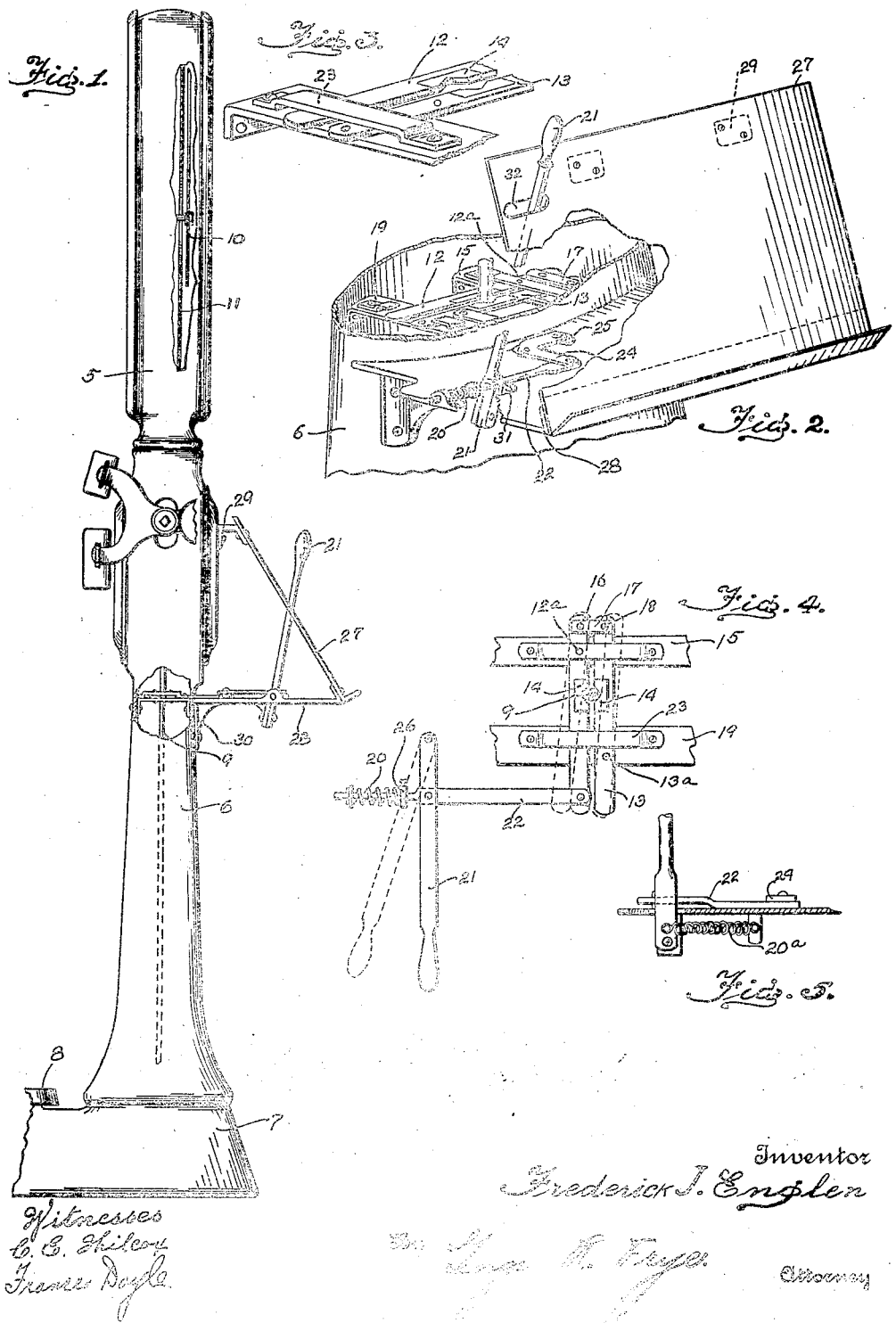
Inventor
Frederick J. Englen

Patented Feb. 23, 1926.

1,574,073

UNITED STATES PATENT OFFICE.

FREDERICK J. ENGLEN, OF OMAHA, NEBRASKA, ASSIGNOR TO TOLEDO SCALE COMPANY, OF TOLEDO, OHIO, A CORPORATION OF NEW JERSEY.

LOCKING DEVICE FOR SCALES.

Application filed June 30, 1919. Serial No. 307,787.

*To all whom it may concern:*

Be it known that I, FREDERICK J. ENGLEN, a citizen of the United States, residing at Omaha, in the county of Douglas and State of Nebraska, have invented certain new and useful Improvements in Locking Devices for Scales, of which the following is a specification.

This invention relates to locking devices for scale mechanisms, and more particularly to devices to lock an automatic scale in any adjusted position.

Among the objects of this invention is the provision of a locking mechanism for automatic scales adapted to hold the indicating hand in any position; to prevent the transmission of shocks to the delicate parts of the scale mechanism, and to allow the loading and unloading of the scale platform to proceed irrespective of the time the weight indication is read by the operator.

A further object is to provide a lock for automatic scales that will clamp the steelyard rod or other moving part of the scale in such manner as not to interfere with the continued operation of the scale whenever desired, and which will have no tendency to shift the position of any scale lever on its pivots.

With the above and other objects in view, which will readily appear as the invention is better understood, my invention consists of the novel construction, combination and arrangement of parts to be hereinafter more fully described and particularly pointed out in the appended claims.

Reference is to be had to the accompanying drawings illustrating preferred embodiments of my invention and wherein similar reference numerals designate similar parts throughout the several views.

In the drawings:—

Figure 1 is a side elevation of a portion of an automatic scale equipped with my improved locking mechanism;

Figure 2 is a detail perspective view of the locking mechanism in position upon the scale;

Figure 3 is an enlarged detail perspective view showing the clamping levers;

Figure 4 is a plan view of a slightly modified form of locking mechanism; and

Figure 5 is a detail elevation of a modified form of mounting the operating handle.

In the drawings, 5 designates the casing of the scale adapted to enclose the weighing or load-offsetting mechanism and supported upon a suitable column 6, the lower end of which rests on the scale base 7. The platform 8 is carried upon the platform-supporting lever mechanism, which is suitably mounted within the base 7 and connects with the weighing mechanism in the casing 5 through a steelyard rod or suitable intermediate mechanism extending through the column 6.

It will be understood that any suitable platform or platform lever mechanism may be employed in connection with the weighing mechanism of the scale, and the weighing mechanism herein shown is illustrated merely for the purpose of showing one application of an automatic scale wherein the present invention can be readily employed. The particular automatic scale herein shown has been found to successfully demonstrate the capabilities of the invention and employs a pendulum weighing mechanism including a pendulum adapted to be suitably connected with the platform lever mechanism through the medium of a steelyard rod 9 and so arranged and positioned that upon the placing of a load upon the scale platform the pendulum will be swung upwardly into a position counterbalancing the weight of the load on the platform, connection being made from the weighing mechanism whereby the upward movement of the pendulum will be transmitted to the indicating hand 10 through a rack meshing with a pinion on the shaft of the indicating hand. The hand 10 will be moved around the dial 11 in accordance with the extent of displacement of the pendulum and intermediate mechanism, exhibiting to the operator the weight of the load on the platform. Inasmuch as the present invention is not dependent for its operation upon any particular form of weighing mechanism, no attempt is made in this application to show a complete scale mechanism nor to portray the action of the scale in its load-counterbalancing or weighing operations, only so much of an automatic weighing scale being shown as is necessary to clearly illustrate the operation and co-action of the claimed invention herein disclosed.

From the above it will be understood that the steelyard rod 9 moves vertically as the platform 8 is depressed by a load placed thereon, and communicates this movement to the pendulum and indicating mechanism. In the embodiment herein illustrated I have mounted my locking mechanism in such position as to engage the steelyard rod 9 and prevent its vertical movement when it is desired to lock the scale. To accomplish the locking of the scale mechanism I mount a pair of clamping levers 12 and 13 within the column 6 adjacent the steelyard rod and provide hardened contact faces 14 for direct engagement with the steelyard rod (see Figure 2). One of the clamping levers, as 12, is pivoted intermediate its ends, as at 12$^a$, on a bracket 15 supported in the column 6, the hardened face 14 on this lever being on the opposite side of the fulcrum point 12$^a$ from the point of connection 16 of this lever with the link 17, the opposite end of which is fulcrumed, as at 18, adjacent the end of the other clamping lever 13. The fulcrum point 13$^a$ of the lever 13 is on the opposite side of the steelyard rod 9 from its point of connection with the link 17, and the fulcrum pin is preferably mounted in a bracket 19, similarly mounted in the column 6 as the bracket 15 above referred to. The purpose of so mounting the clamping levers is readily apparent from Figure 4. Thus, when the clamping levers 12 and 13 are in the position shown in full lines, both of the hardened faces 14 engage the steelyard rod and clamp it against movement, the spring 20 being arranged to directly force the hardened face on the lever 12 against the steelyard rod and to exert a pull upon the link 17 to bring the hardened face of the lever 13 into contact with the steelyard rod. When the operating handle 21 is swung to the position shown in dotted lines, a pull is exerted on the link 22 to shift the lever 12 into the dotted line position, swinging the hardened face on such lever away from the steelyard rod and moving the link 17 in the opposite direction to force the lever 13 into the dotted line position to remove the hardened face thereof from contact with the steelyard rod, since the fulcrum 12$^a$ of the lever 12 is between the point of engagement with the steelyard rod and the connection to the link 17.

To prevent any up and down wabbling of the clamping levers while in contact with the steelyard rod, I provide a pair of braces 23 in position to hold the clamping levers against vertical movement (see Figure 3).

The means of rocking the clamping levers 12 and 13 may take any desired form. In Figures 1 and 2 I have shown an operating handle 21 arranged substantially vertically and pivoted at its lower extremity. Intermediate its ends the handle 21 is fixed to the link 22, one extremity of which is pivoted to the bell crank lever 24, the other extremity of which is pivotally connected with the link 25 which engages one of the clamping levers. The spring 20 is preferably mounted on the link 22 between a collar 26 adjustably secured on said link and a fixed portion of the weighing mechanism, the pressure of the spring serving to maintain the hardened faces of the clamping levers in engagement with the steelyard rod at all times, except when the operating handle 21 is swung to rock the clamping levers into the dotted line position shown, releasing the steelyard rod to transmit to the pendulum and indicating mechanism the pull imposed on the scale platform by a load placed thereon. After the weight of a load has been determined the operator merely releases the handle 21 and the spring immediately forces the clamping levers into engagement with the steelyard rod, securing the scale mechanism against movement irrespective of the removal of the load from the scale platform.

Thus, after a weighing has been effected, the indicating hand can be locked in position showing the weight of the load, and the load can then be removed without disturbing the position of the indicating hand. The operator can then make a note of the indicated weight some time after the load has been removed from the scale. Also, when the next load is placed on the scale platform the operating handle is swung to release the clamping levers and the pendulum mechanism and index hand merely move from the position occupied while the scale was locked to a position indicating the weight of the load now on the platform—a relatively short movement compared with the ordinary use of an automatic scale wherein the indicating hand returns to zero after each weighing.

In the embodiment shown in Figure 4 I have done away with the bell crank lever 24 and link 25 of the arrangement shown in Figure 2, connecting the link 22 directly with one of the locking levers, as 12.

It will be noted that connection can be made from the operating handle with either of the clamping levers 12 or 13. In the modification illustrated in Figure 2 I have connected the link 25 with the clamping lever 13, and by making this connection between the fulcrum point and the point of connection with the link 17 I effect a rocking movement of the clamping levers so as to separate the hardened faces, exactly as is effected in the modification illustrated in Figure 4 wherein connection is made with the lever 12.

In Figure 5 I have shown an embodiment wherein I use a spring 20$^a$ connected directly with the operating handle in place of with the intermediate link 22.

To facilitate the use of the locking mechanism by the operator, I preferably arrange a desk or table 27 adjacent the operating handle 21 to provide a place for the operator to keep his pad and note the weight of each load weighed over the scale. In the illustrated embodiment I have mounted the desk or table 27 directly on the column 6 of the scale, supporting it by means of a lower plate 28 and a pair of upper brackets 29, the plate 28 being conveniently supported by lower brackets 30. On the plate 28 are provided suitable bosses to provide a fulcrum for the bell crank lever 24 (see Figure 2) and to provide a permanent stop for one end of the spring 20. Suitable slots 31 and 32 are provided in the plate 28 and table 27 for the passage of the operating handle 21. With this construction I provide a readily accessible locking mechanism adapted to normally hold the scale mechanism in locked position, whereby loads can be deposited on the scale platform without danger of imparting shock to the delicate parts of the weighing and indicating mechanism. After the load is placed upon the platform, the operator swings the handle 21 to release the locking device and the weight of the load is shown by the movement of the index hand 10 around the dial 11. The operator then releases the handle 21 and the locking device grips the steelyard in its new position, holding the index hand in its position showing the weight of the load, even though the load be afterwards removed from the scale platform. The operator can then make his note at any time before he releases the locking device to effect the next weighing.

While it will be apparent that the illustrated embodiments of my invention herein disclosed are well calculated to adequately fulfill the objects primarily stated, it is to be understood that my invention is susceptible to variation, modification and change without departing from the spirit and scope of the invention as set forth in the subjoined claims.

Having described my invention, I claim:

1. In a scale, in combination, weighing mechanism, including a steelyard rod, and clamping means engageable with said steelyard rod to hold said rod in any weighing position.

2. In a scale and in combination with the weighing mechanism thereof, means for locking the weighing mechanism in any adjusted position, including a pair of clamping levers engaging a movable member of the weighing mechanism to hold it in adjusted position, said mechanism being pivoted on opposite sides of said member, a link connecting the clamping levers, and means connected to one of said levers for rocking the levers to disengage them from said movable member.

3. In a scale and in combination with the weighing mechanism thereof, means for locking the weighing mechanism in any adjusted position, including a pair of clamping levers normally engaging a movable member of the weighing mechanism while said member is in weighing position and pivoted on opposite sides of said member, a link connecting the clamping levers, and means connected to one of said levers for rocking the levers to separate them to disengage them from said movable member.

4. In a scale and in combination with the weighing mechanism thereof, means for locking the weighing mechanism in any adjusted position, including a pair of clamping levers engaging a movable member of the weighing mechanism and pivoted on opposite sides of said member, a link connecting the clamping levers, and means normally pressing the levers toward each other to engage the movable member.

5. In a scale and in combination with the weighing mechanism thereof, means for locking the weighing mechanism in any adjusted position, including a pair of clamping levers engaging a movable member of the weighing mechanism while said member is in weighing position and pivoted on opposite sides of said member, a link connecting the clamping levers, an operating handle connected to one of said levers for rocking the levers to disengage them from said movable member.

6. In a scale and in combination with the weighing mechanism thereof, means for locking the weighing mechanism in any adjusted position, including a pair of clamping levers engaging a movable member of the weighing mechanism and pivoted on opposite sides of said member, a link connecting the clamping levers, and an operating handle normally pressing the levers toward each other to engage the movable member.

7. In a scale and in combination with the weighing mechanism thereof, means for locking the weighing mechanism in any adjusted position, including a pair of clamping levers provided with insets of hardened material engaging a movable member of the weighing mechanism and pivoted on opposite sides of said member, a link connecting the clamping levers, and means connected to one of said levers for rocking the levers to disengage them from said movable portion.

8. In a scale and in combination with the weighing mechanism thereof including a steelyard rod, locking mechanism adapted to clamp the weighing mechanism in any adjusted position, including a pair of clamping levers pivoted on opposite sides of the steelyard rod and normally held in engagement therewith, a link connecting the clamping levers, and means connected to one of said levers for swinging said levers to disengage them from the steelyard rod whenever desired.

9. In a scale and in combination with the weighing mechanism thereof including a steelyard rod, locking mechanism adapted to clamp the weighing mechanism in any adjusted position, including a pair of clamping levers pivoted on opposite sides of the steelyard rod in substantially horizontal position and normally held in engagement therewith, braces arranged to prevent vertical movement of the clamping levers, a link connecting the clamping levers, and means connected to one of said levers for swinging said levers to disengage them from the steelyard rod whenever desired.

10. In a scale and in combination with the weighing mechanism thereof including a steelyard rod, locking mechanism adapted to clamp the weighing mechanism in any adjusted position, including a pair of clamping levers pivoted on opposite sides of the steelyard rod and normally held in engagement therewith, a link connected to one of said levers, and an operating handle connected to said link and adapted when rocked to swing the clamping levers apart to release the steelyard rod.

11. In a scale and in combination with the weighing mechanism thereof, a locking device arranged to normally hold the weighing mechanism against movement, including an operating handle, and a table carried by the scale and provided with openings to receive the operating handle.

12. In a scale and in combination with the weighing mechanism thereof, a locking device arranged to normally hold the weighing mechanism against movement, including a pair of clamping levers normally engaging a movable member of the weighing mechanism, a link connected to one of said levers, a plate mounted on the scale and adapted to support said link, an operating handle pivoted on said plate and connected with said link whereby when the handle is rocked the clamping levers are separated to release the weighing mechanism, and a table secured on said plate adjacent the operating handle.

FREDERICK J. ENGLEN.